(12) United States Patent
Yang

(10) Patent No.: US 12,501,373 B2
(45) Date of Patent: Dec. 16, 2025

(54) METHOD FOR REPORTING POWER HEADROOM REPORT AND TERMINAL

(71) Applicant: VIVO MOBILE COMMUNICATION CO., LTD., Guangdong (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 366 days.

(21) Appl. No.: 17/889,442

(22) Filed: Aug. 17, 2022

(65) Prior Publication Data

US 2022/0394631 A1    Dec. 8, 2022

Related U.S. Application Data

(63) Continuation of application No. PCT/CN2021/078401, filed on Mar. 1, 2021.

(30) Foreign Application Priority Data

Mar. 6, 2020   (CN) .......................... 202010152859.X

(51) Int. Cl.
*H04W 52/36*    (2009.01)
*H04W 52/34*    (2009.01)

(52) U.S. Cl.
CPC ......... *H04W 52/365* (2013.01); *H04W 52/34* (2013.01)

(58) Field of Classification Search
CPC ............. H04W 52/365; H04W 52/146; H04W 52/367; H04W 72/23; H04W 24/10; H04W 52/242; H04W 76/27; H04W 52/08; H04W 52/325; H04W 72/0473; H04W 52/42; H04W 72/1268; H04W 52/34; H04W 72/046; H04W 16/28; H04W 88/02; H04W 52/54; H04W 52/10; H04W 72/21; H04W 74/002; H04W 74/0833; H04W 52/248; H04W 52/362; H04W 72/12; H04W 72/121; H04W 88/06; H04W 52/281; H04W 52/44
See application file for complete search history.

(56) References Cited

U.S. PATENT DOCUMENTS 10,979,984 B2    4/2021   Iwai et al.
11,044,676 B2 *  6/2021   He ........................ H04W 80/02
(Continued)

FOREIGN PATENT DOCUMENTS

| CN | 109151981 A | 1/2019 |
|---|---|---|
| CN | 109219127 A | 1/2019 |

(Continued)

OTHER PUBLICATIONS

Supplementary European Search Report regarding European Patent Application No. 21765095.1-1206, dated Jul. 13, 2023.
First Office Action regarding Japanese Patent Application No. 2022-549766, dated Sep. 21, 2023. Translation provided by Bohui Intellectual Property.
(Continued)

*Primary Examiner* — Golam Sorowar
(74) *Attorney, Agent, or Firm* — Harness, Dickey & Pierce, P.L.C.

(57) ABSTRACT

A method for reporting a power headroom report includes: in a case that a trigger condition for reporting a power headroom report is satisfied, reporting a power headroom report. The power headroom report includes power headroom report information of at least one power control object, and a power control object is an antenna panel or a beam.

20 Claims, 6 Drawing Sheets

(56) References Cited

U.S. PATENT DOCUMENTS

| | | | |
|---|---|---|---|
| 2012/0281568 A1 | 11/2012 | Ho et al. | |
| 2014/0056278 A1* | 2/2014 | Marinier | H04W 52/367 370/330 |
| 2018/0324715 A1* | 11/2018 | Ryoo | H04L 5/0007 |
| 2019/0053170 A1 | 2/2019 | Lee et al. | |
| 2019/0141640 A1* | 5/2019 | Abedini | H04W 52/146 |
| 2020/0022093 A1* | 1/2020 | Han | H04W 72/046 |
| 2020/0037269 A1 | 1/2020 | Ryu et al. | |
| 2020/0084735 A1* | 3/2020 | Cheng | H04W 52/365 |
| 2020/0367178 A1* | 11/2020 | Osawa | H04W 52/54 |
| 2021/0119688 A1* | 4/2021 | Enescu | H04W 52/0248 |
| 2021/0153142 A1* | 5/2021 | Lee | H04W 52/242 |
| 2022/0322248 A1* | 10/2022 | Gao | H04W 52/367 |

FOREIGN PATENT DOCUMENTS

| | | |
|---|---|---|
| CN | 110536397 A | 12/2019 |
| CN | 110999102 A | 4/2020 |
| EP | 3319376 A2 | 5/2018 |
| EP | 3515132 A1 | 7/2019 |
| EP | 3567939 A1 | 11/2019 |
| EP | 4017144 A1 | 6/2022 |
| WO | WO-2019099634 A1 | 5/2019 |

OTHER PUBLICATIONS

"Power headroom report in NR," Ericsson, 3GPP TSG-RAN WG2 #99, Tdoc R2-1708199, dated Aug. 25, 2017.

"Consideration on PHR with multi-beam operation," Huawei, HiSilicon, 3GPP TSG-RAN WG2 Meeting #99bis, R2-1711434, dated Oct. 13, 2017.

First Office Action regarding Indian Patent Application No. 202217052504, dated Nov. 8, 2023. Translation provided by Intellectual Property India.

Decision of Refusal regarding Japanese Patent Application No. 2022-549766, dated Mar. 4, 2024.

3GPP TSG-RAN NR, "Medium Access Control (MAC) Protocol Specification (Release 15)", 3GPP TS 38.321, V15.8.0, (Dec. 2019), Jan. 7, 2020.

International Search Report and Written Opinion of the International Searching Authority regarding International Patent Application No. PCT/CN2021/078401, dated May 21, 2021. Translation provided by Bohui Intellectual Property.

Reconsideration Report before Appeal regarding Japanese Patent Application No. 2022- 549766, dated Oct. 28, 2024.

Notice of Termination of Reconsideration before Appeal regarding Japanese Patent Application No. 2022-549766, dated Nov. 1, 2024.

* cited by examiner

In a case that a trigger condition for reporting a power headroom report is satisfied, report a power headroom report, where the power headroom report includes power headroom report information of at least one power control object, and the power control object is an antenna panel or a beam ⸺ 21

| R | R | PH (Type 1, PCell) |
|---|---|---|
| R | R | $P_{CMAX,f,c}$ |

| C₇ | C₆ | C₅ | C₄ | C₃ | C₂ | C₁ | R |
|---|---|---|---|---|---|---|---|
| P | V | PH (Type 2, SpCell of other MAC entities) ||||||
| R | R | $P_{CMAX,f,c}$ 1 ||||||
| P | V | PH (Type 1, PCell) ||||||
| R | R | $P_{CMAX,f,c}$ 2 ||||||
| P | V | PH (Type X, Serving Cell 1) ||||||
| R | R | $P_{CMAX,f,c}$ 3 ||||||

...

| P | V | PH (Type X, Serving Cell n) ||||||
|---|---|---|---|---|---|---|---|
| R | R | $P_{CMAX,f,c}$ m ||||||

FIG. 4

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of other MAC entities) ||||||
| R | R | $P_{CMAX,f,c}$ 1 ||||||
| P | V | PH (Type 1, PCell) ||||||
| R | R | $P_{CMAX,f,c}$ 2 ||||||
| P | V | PH (Type X, Serving Cell 1) ||||||
| R | R | $P_{CMAX,f,c}$ 3 ||||||

...

| P | V | PH (Type X, Serving Cell n) ||||||
| R | R | $P_{CMAX,f,c}$ m ||||||

FIG. 5

METHOD FOR REPORTING POWER HEADROOM REPORT AND TERMINAL

CROSS-REFERENCE TO RELATED APPLICATIONS

This application is a Bypass Continuation Application of PCT/CN2021/078401 filed on Mar. 1, 2021, which claims priority to Chinese Patent Application No. 202010152859.X filed on Mar. 6, 2020, which are incorporated herein by reference in their entirety.

TECHNICAL FIELD

Embodiments of the present application relate to the field of wireless communications technologies, and in particular, to a method for reporting a power headroom report and a terminal.

BACKGROUND

User equipment (UE, also referred to as terminal) triggers reporting of a power headroom report (PHR) based on a trigger condition specified in a protocol.

SUMMARY

According to a first aspect, an embodiment of the present application provides a method for reporting a power headroom report, applied to a terminal and including: in a case that a trigger condition for reporting a power headroom report is satisfied, reporting a power headroom report, where the power headroom report includes power headroom report information of at least one power control object, and the power control object is an antenna panel or a beam.

According to a second aspect, an embodiment of the present application provides a terminal, including:
  a reporting module, configured to: in a case that a trigger condition for reporting a power headroom report is satisfied, report a power headroom report, where the power headroom report includes power headroom report information of at least one power control object, and the power control object is an antenna panel or a beam.

According to a third aspect, an embodiment of the present application further provides a terminal, including a processor, a memory, and a computer program stored in the memory and executable on the processor, where when the computer program is executed by the processor, the steps of the method for reporting a power headroom report according to the first aspect are implemented.

According to a fourth aspect, an embodiment of the present application provides a non-transitory computer-readable storage medium, where a computer program is stored in the non-transitory computer-readable storage medium, and when the computer program is executed by a processor, the steps of the method for reporting a power headroom report according to the first aspect are implemented.

BRIEF DESCRIPTION OF DRAWINGS

Other advantages and benefits will become apparent to those of ordinary skill in the art by reading detailed description of the exemplary embodiments below. The accompanying drawings are merely intended to illustrate the objectives of the embodiments and are not intended to limit the present application. Throughout the accompanying drawings, the same reference numerals represent the same components.

FIG. 4 and FIG. 5 are schematic diagrams of a format of a multi-entry PHR MAC CE;

DETAILED DESCRIPTION OF EMBODIMENTS

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of the present application, the terms "an example" or "for example" are used to represent an example, an illustration, or a description. Any embodiment or design scheme described as "an example" or "for example" in the embodiments of the present application should not be construed as being more preferred or advantageous than other embodiments or design schemes.

The following describes the embodiments of the present application with reference to the accompanying drawings. A method for reporting a power headroom report and a terminal that are provided by the embodiments of the present application may be applied to a wireless communications system. The wireless communications system may be a 5G system, an evolved long term evolution (eLTE) system, or a subsequent evolved communications system.

Figures 1, 2, 3:
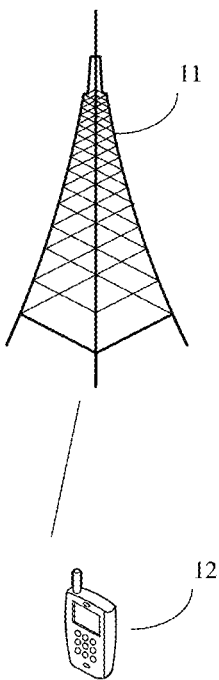
FIG. 1 is a schematic architectural diagram of a wireless communications system according to an embodiment of the present application.
FIG. 2 is a schematic flowchart of a method for reporting a power headroom report according to an embodiment of the present application.
FIG. 3 is a schematic diagram of a format of a single-entry PHR MAC CE.

Referring to FIG. 1, FIG. 1 is a schematic architectural diagram of a wireless communications system according to an embodiment of the present application. As shown in FIG. 1, the wireless communications system may include a network-side device 11 and a terminal 12. The terminal 12 may be connected to the network-side device 11. In an actual application, connection between the foregoing devices may be wireless connection. To conveniently and intuitively represent a connection relationship between the devices, a solid line is used in FIG. 1.

It should be noted that the foregoing communications system may include a plurality of terminals 12, and the network-side device 11 may communicate with the plurality of terminals 12 (transmitting signaling or data).

The network-side device 11 provided in this embodiment of the present application may be a base station. The base station may be a commonly used base station, or may be an evolved node base station (eNB), or may be a device such as a network-side device (for example, a next generation base station (gNB)), a transmission and reception point (TRP), or a cell in a 5G system; or a network-side device in a later evolved communications system.

The terminal 12 provided in some embodiments of the present application may be a mobile phone, a tablet computer, a notebook computer, an ultra-mobile personal computer (UMPC), a netbook, a personal digital assistant (PDA), or the like.

Usually, the PHR includes only a power headroom (PH) corresponding to a cell. When the UE uses different antenna panels or different beams to perform transmission with a network side, PHs corresponding to the panels or beams are usually different. However, the PHR does not include such information, and consequently accurate and precise power control cannot be guaranteed.

Referring to FIG. 1, the present application provides a method for reporting a power headroom report, applied to a terminal and including:

Step 21: In a case that a trigger condition for reporting a power headroom report is satisfied, report a power headroom report, where the power headroom report includes power headroom report information of at least one power control object, and the power control object is an antenna panel or a beam.

In this embodiment of the present application, the antenna panel may also be referred to as: an antenna group, an antenna port group, an antenna set, an antenna port set, a beam set, a beam sub-set, an antenna array, an antenna port array, an antenna sub-array, an antenna port sub-array, a logical entity, an entity, an antenna entity, or the like.

In this embodiment of the present application, the beam may also be referred to as: beam information, spatial relation information, spatial domain transmission filter information, spatial filter information, transmission configuration indicator state (TCI state) information, quasi-colocation (QCL) information, a QCL parameter, or the like. The downlink beam information may be usually represented by TCI state information or QCL information. Uplink beam information may be usually represented by using spatial relation information.

In this embodiment of the present application, the terminal can report a power headroom of an antenna panel or a beam when reporting the power headroom report, not limited to reporting only a power headroom corresponding to a cell, thereby ensuring accurate and precise power control.

The following briefly describes the power headroom reporting (PHR).

The PHR is used to provide the following information to a network side:

Type 1 power headroom: indicates a difference between a nominal UE maximum transmit power and an estimated power for transmitting an uplink shared channel (UL-SCH) of each active serving cell.

Type 2 power headroom: indicates a difference between a nominal UE maximum transmit power and an estimated power for transmitting an UL-SCH and a physical uplink control channel (PUCCH) of a special cell (SpCell) of other MAC entities, where the other medium access control (MAC) entities herein may be an evolved universal mobile telecommunications system (UMTS) terrestrial radio access (E-UTRA) MAC entity for dual connectivity of master cell group (MCG) in E-UTRA and secondary cell group (SCG) in NR (EN-DC), NR-E-UTRA dual connectivity (NE-DC), and next generation radio access network (NG-RAN) E-UTRA-NR dual connectivity (NGEN-DC).

Type 3 power headroom: indicates a difference between a nominal UE maximum transmit power and an estimated power for transmitting a sounding reference signal (SRS) of each active serving cell.

In this embodiment of the present application, optionally, the power headroom report information includes at least one of:

power headroom (PH);
information about the serving cell, for example, an index of a cell;
maximum transmit power;
P-MPR;
duty cycle; or
indication information used to indicate whether there is power backoff.

The following describes the trigger condition for reporting the power headroom report.

In this embodiment of the present application, optionally, the trigger condition includes at least one of:

(1) A current power control object having been changed.

Changing may be to change or having changed from the current power control object to another power control object.

In this embodiment of the present application, optionally, the current power control object is a power control object currently used by the terminal to connect to or perform transmission with the network side.

The another power control object may be a power control object that is currently not used by the terminal, not activated, not enabled, or not added.

In this embodiment of the present application, optionally, the current power control object having been changed includes:

a network side having indicating to change the current power control object; or
the terminal having changed the current power control object based on a preset change trigger condition.

(2) A pathloss measurement value or a variation of a pathloss measurement value of the current power control object satisfying a first preset condition.

The first preset condition is, for example, that the pathloss measurement value is greater than, equal to, or less than a first preset threshold, or the variation of a pathloss measurement value is greater than or equal to a second preset threshold.

(3) A power backoff value or a variation of a power backoff value of the current power control object satisfying a second preset condition.

The second preset condition is, for example, that the power backoff value is greater than or equal to a third preset threshold, or the variation of a power backoff value is greater than or equal to a fourth preset threshold.

(4) A power management maximum power reduction (P-MPR) value or a variation of a P-MPR value of the current power control object satisfying a third preset condition.

The third preset condition is, for example, that the P-MPR value is greater than or equal to a fifth preset threshold, or the variation of a P-MPR value is greater than or equal to a sixth preset threshold.

(5) A P-MPR difference between the current power control object and a first power control object satisfying a fourth preset condition.

In this embodiment of the present application, the first power control object is any power control object or a specified power control object in power control objects of the terminal, other than the current power control object. The specified control object may be, for example, a power control object with a smallest P-MPR in the power control objects, other than the current power control object.

The fourth preset condition is, for example, that the P-MPR difference is greater than, equal to, or less than a seventh preset threshold.

For example, assuming that the terminal has four antenna panels, a currently used antenna panel is an antenna panel 1, and unused antenna panels are antenna panels 2, 3, and 4. Assuming that a P-MPR difference between the antenna panel 2 and the antenna panel 1 is a, a P-MPR difference between the antenna panel 3 and the antenna panel 1 is b, and a P-MPR difference between the antenna panel 4 and the antenna panel 1 is c, where c is greater than the seventh preset threshold, it can be determined that the trigger condition for reporting a power headroom report is satisfied. The antenna panel 4 may or may not be an antenna panel to be currently changed to.

(6) A link quality value or a variation of a link quality value of the current power control object satisfying a fifth preset condition.

The fifth preset condition is, for example, that the link quality value is less than or equal to an eighth preset threshold, or the variation of a link quality value is greater than or equal to a ninth preset threshold.

In this embodiment of the present application, optionally, link quality may be a reference signal received power (RSRP) and/or a signal-to-interference-plus-noise ratio (SINR). If the link quality includes both the RSRP and SINR, the RSRP and the SINR correspond to different determining thresholds.

(7) A link quality difference between the current power control object and the first power control object satisfying a sixth preset condition.

In this embodiment of the present application, the first power control object is any power control object or a specified power control object in power control objects of the terminal, other than the current power control object. The specified control object may be, for example, a power control object with best link quality in the power control objects, other than the current power control object.

In this embodiment of the present application, optionally, the link quality may be a reference signal received power (RSRP) and/or a signal-to-interference-plus-noise ratio (SINR).

(8) A power control object being activated, enabled, or added.

(9) Configuration information of the current power control object or configuration information of the first power control object having been changed.

In this embodiment of the present application, the first power control object is any power control object or a specified power control object in power control objects of the terminal, other than the current power control object.

Configuration information of the power control object may include at least one of: a power control parameter (such as a pathloss reference signal, a maximum transmit power, and/or transmit power control (TPC)), indication information for switching the power control object, indication information for enabling or disabling the power control object, beam indication or beam update information of a channel (such as TCI state information of a downlink channel or downlink reference signal (RS) or spatial relation information of an uplink channel or uplink reference signal), control channel resource information (such as CORESET configuration information) corresponding to the power control object, or cell information corresponding to the power control object or transmission and reception point (TRP) identification information corresponding to the power control object.

(10) Information about a serving transmission and reception point having been changed.

The serving transmission and reception point is a transmission and reception point that is connected to or performs transmission with the terminal.

In this embodiment of the present application, optionally, the information about the serving transmission and reception point having been changed includes:
a network side having configured or activated information about a new transmission and reception point; or
configuration information corresponding to the information about the serving transmission and reception point having been changed; or
related configuration information of a control resource set having been changed.

Optionally, the related configuration information includes at least one of control resource set pool index (CORESET-PoolIndex) information, transmission configuration indicator state (TCI state) information, or search space information.

Optionally, the configuration information corresponding to the information about the serving transmission and reception point includes: at least one of a transmission and reception point identifier, CORESETPoolIndex information, a group identifier, a cell identity, or a physical cell identifier (PCI).

The following describes how to report the power headroom report.

In this embodiment of the present application, at least one medium access control control element (MAC CE) may be used for reporting the power headroom report.

In this embodiment of the present application, when reporting the power headroom report, the terminal may use a single-entry power headroom report medium access control control element (single entry PHR MAC CE) and a multi-entry power headroom report medium access control control element (multiple entry PHR MAC CE).

Referring to FIG. 3, the related single-entry PHR MAC CE includes the following reporting content:
cell power headroom (PH); and
maximum cell transmit power (PCMAX,f,c), which may be used for calculating the PH.

Referring to FIG. 4 and FIG. 5, the related multi-entry PHR MAC CE includes the following reporting content:
whether there is a PH field corresponding to a serving cell index (ServCellIndex);
whether the PH value is based on actual transmission or a reference format (reference format);
cell power headroom (PH) corresponding to ServCellIndex;
maximum cell transmit power corresponding to ServCellIndex (PCMAX, f, c); and
whether an MAC entity adopts power backoff according to power management.

The following describes the MAC CE in this embodiment of the present application.

(I) In some embodiments of the present application, the power headroom report is reported by using one MAC CE, where the MAC CE carries power headroom report information of a preset power control object.

That is, the power headroom report information (such as the cell index, maximum transmit power, and/or PH) carried in the MAC CE all corresponds to the preset power control object.

In this embodiment of the present application, the power headroom report may be reported by using an existing MAC CE format.

Optionally, the preset power control object is specified by the protocol or configured by the network side.

Optionally, the preset power control object is a current power control object, a to-be-changed-to power control object, or a changed-to power control object.

In this embodiment of the present application, optionally, the network side may learn of the preset power control object corresponding to the power headroom report information carried by the MAC CE, and therefore the MAC CE may not carry an identifier or corresponding number of the preset power control object.

In this embodiment of the present application, optionally, the power headroom report information includes at least one of:
power headroom;
information about a serving cell;
maximum transmit power;
P-MPR;
duty cycle; or
indication information used to indicate whether there is power backoff.

(II) In some embodiments of the present application, the power headroom report is reported by using one MAC CE, where the MAC CE carries power headroom report information of at least one power control object.

In some embodiments of the present application, optionally, the MAC CE further carries identification information of the at least one power control object or index information corresponding to the at least one power control object.

In some embodiments of the present application, when the MAC CE carries power headroom report information of a plurality of power control objects, the power headroom report information of the plurality of power control objects is arranged in a preset order, for example, being arranged in an order of identifiers or an order of corresponding numbers of the power control objects.

In this embodiment of the present application, the identification information or the index information includes at least one of:
identification information of an antenna panel or index information corresponding to an antenna panel;
identification information of a beam or index information corresponding to a beam; or
identification information of an antenna panel or index information corresponding to an antenna panel, and identification information of a beam corresponding to the antenna panel or index information corresponding to a beam corresponding to the antenna panel.

In this embodiment of the present application, an identifier of the antenna panel may be: an antenna group identifier, an antenna port group identifier, antenna set identifier, an antenna port set identifier, a beam set identifier, a beam subset identifier, an antenna array identifier, an antenna port array identifier, an antenna subarray identifier, an antenna port subarray identifier, a logical entity identifier, an entity identifier, an antenna entity identifier, a reference signal resource configuration identifier, a reference signal resource identifier, a reference signal resource set identifier, a TCI state identifier, a Quasi-colocation (QCL) information identifier, a spatial relation identifier, or the like.

In this embodiment of the present application, the at least one power control object may be all or part of the power control objects of the terminal.

In this embodiment of the present application, optionally, the power control object includes a current power control object.

In this embodiment of the present application, optionally, the power headroom report information includes at least one of:
power headroom;
information about a serving cell;
maximum transmit power;
P-MPR;
duty cycle; or
indication information used to indicate whether there is power backoff.

In this embodiment of the present application, any one piece of information in the power headroom report information is specific to the serving cell (cell specific), or specific to the power control object (for example, panel specific or beam specific), or specific to a power control object corresponding to the serving cell.

(III) In some embodiments of the present application, the power headroom report is reported by using a plurality of MAC CEs, where each of the MAC CEs carries power headroom report information of at least one power control object.

This embodiment includes two cases: one is that one MAC CE carries power headroom report information of one power control object; the other is that one MAC CE carries power headroom report information of a plurality of power control objects.

In some embodiments, each of the MAC CEs further carries identification information of the power control object or index information corresponding to the power control object, for distinguishing.

In some embodiments, identification information of each of the MAC CEs corresponds to identification information of a corresponding power control object.

In this manner, a correspondence between identification information of MAC CEs and identification information of power control objects needs to be prescribed in advance or indicated by the network. For example, when one MAC CE carries power headroom report information of one power control object, the correspondence may be as follows: a MAC CE with an identifier 1 corresponds to an antenna panel A, and a MAC CE with an identifier 2 corresponds to an antenna panel B. For example, when one MAC CE carries power headroom report information of a plurality of power control objects, the correspondence may be as follows: the MAC CE with the identifier 1 corresponds to the antenna panels A and B, and the MAC CE with the identifier 2 corresponds to antenna panels C and D.

In some embodiments, optionally, when the MAC CE carries power headroom report information of a plurality of power control objects, the power headroom report information of the plurality of power control objects is arranged in a preset order, for example, being arranged in an order of identifiers or an order of corresponding numbers of the power control objects.

In this embodiment of the present application, the identification information or the index information includes at least one of:
identification information of an antenna panel or index information corresponding to an antenna panel;
identification information of a beam or index information corresponding to a beam; or identification information of an antenna panel or index information corresponding to an antenna panel, and identification information of a beam corresponding to the antenna panel or index information corresponding to a beam corresponding to the antenna panel, for example, a specific beam of a specific antenna panel.

In this embodiment of the present application, an identifier of the antenna panel may be: an antenna group identifier, an antenna port group identifier, antenna set identifier, an antenna port set identifier, a beam set identifier, a beam subset identifier, an antenna array identifier, an antenna port array identifier, an antenna subarray identifier, an antenna port subarray identifier, a logical entity identifier, an entity identifier, an antenna entity identifier, a reference signal resource configuration identifier, a reference signal resource identifier, a reference signal resource set identifier, a TCI state identifier, a Quasi-colocation (QCL) information identifier, a spatial relation identifier, or the like.

In this embodiment of the present application, optionally, the power headroom report information includes at least one of:
power headroom;
information about a serving cell;
maximum transmit power;
P-MPR;
duty cycle; or
indication information used to indicate whether there is power backoff.

In this embodiment of the present application, optionally, in a case that the MAC CE carries the power headroom report information of the at least one power control object, any one piece of information in the power headroom report information is specific to the serving cell, or is specific to the power control object, or is specific to a power control object corresponding to the serving cell.

Optionally, the power headroom and the maximum transmit power are specific to the power control object, or are specific to the power control object corresponding to the serving cell. Certainly, other information (such as P-MPR) may also be specific to the power control object, or specific to the power control object corresponding to the serving cell.

In the foregoing embodiments, the power control object is:
an antenna panel;
a beam; and
a beam corresponding to an antenna panel.

In a case where the MAC CE includes the identification information of the power control object or index information corresponding to the power control object, and the power control object is a beam corresponding to an antenna panel, the MAC CE includes not only the identification information of the antenna panel or index information corresponding to the antenna panel, but also identification information of the beam corresponding to the antenna panel or index information corresponding to the beam corresponding to the antenna panel.

The MAC CE used for reporting the power headroom report may carry power headroom report information of at least one antenna panel, or carry power headroom report information of at least one beam, or carry power headroom report information of a beam corresponding to at least one antenna panel.

In some embodiments of the present application, optionally, before the reporting a power headroom report, the method further includes: determining power headroom information based on a measurement result corresponding to the power control object.

The measurement result is, for example, a measurement result of a downlink reference signal (DL RS), such as a pathloss RS. For a pathloss reference in a 5G NR system, the network side may configure a plurality of downlink pathloss references for one cell simultaneously (for example, each pathloss reference corresponds to a different reference signal (for example, path_loss_reference_1 corresponds to a synchronization signal block 1 (SSB1), and path_loss_reference_2 corresponds to an SSB2)). The plurality of downlink pathloss references of each cell may correspond to different power control objects, that is, being used for pathloss measurement corresponding to different power control objects. For uplink transmission (such as PUCCH, physical uplink shared channel (PUSCH), or SRS) of the terminal, the network side may indicate, by using RRC, MAC CE or, PDCCH, to change a pathloss reference currently used by the terminal.

In this embodiment of the present application, the P-MPR and the like may alternatively be determined through other measurements.

For a power control object that is currently not used, not activated, not enabled, or not added, power headroom information may alternatively be determined based on a measurement result corresponding to the power control object, and the determined power headroom information is virtual power headroom information.

In some embodiments of the present application, optionally, the determining power headroom information based on a measurement result corresponding to the power control object includes:
measuring a downlink reference signal corresponding to the power control object; and
determining a power headroom of the power control object based on a measurement result of the downlink reference signal.

In this embodiment of the present application, optionally, all or part of calculation parameters used in determining the power headroom information are specific to the power control object.

That is, the power headroom information may be calculated by using a calculation formula in an existing 3GPP protocol. However, calculation parameters in the existing calculation formula are all cell-specific. In implementation of the present application, all or part of the calculation parameters used in the calculation formula may be changed to be specific to the power control object. Changing the calculation parameters to be specific to the power control object may be configured by a network-side device by using radio resource control (RRC) signaling. Alternatively, the formula is directly specified by the protocol.

In this embodiment of the present application, optionally, the following formula is used for calculating the power headroom:

$$PH_{type1,b,f,c}(i,j,q_d,l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}$$

$$PH_{type3,b,f,c}(i,q_s) = P_{CMAX,f,c}(i) - \{P_{O\_SRS,b,f,c}(q_s) + 10\log_{10}(2^{\mu} \cdot M_{SRS,b,f,c}(i) + \alpha_{SRS,b,f,c}(q_s) \cdot PL_{b,f,c}(q_d) + h_{b,f,c}(i)\}$$

where, the calculation parameters include: a maximum transmit power $P_{CMAX,f,c}(i)$, open-loop receive-end power target values $P_{O\_PUSCH,b,f,c}(j)$ and $P_{O\_SRS,b,f,c}(q_s)$ the number of resource blocks RBs $M_{RB,b,f,c}^{PUSCH}(i)$ and $M_{SRS,b,f,c}(i)$, partial pathloss compensation factors $\alpha_{b,f,c}(j)$ and $\alpha_{SRS,b,f,c}(q_s)$, pathloss estimation $PL_{b,f,c}(q_d)$, a transmission format related parameter $\Delta_{TF,b,f,c}(i)$, power control adjustment state values $f_{b,f,c}(i,l)$ and $h_{b,f,c}(i)$, and the like.

In the foregoing calculation parameters, the maximum transmit power, partial pathloss compensation factor, pathloss estimation, and the like may be specific to the power control object, for example, being panel-specific or beam-specific.

Figure 6:
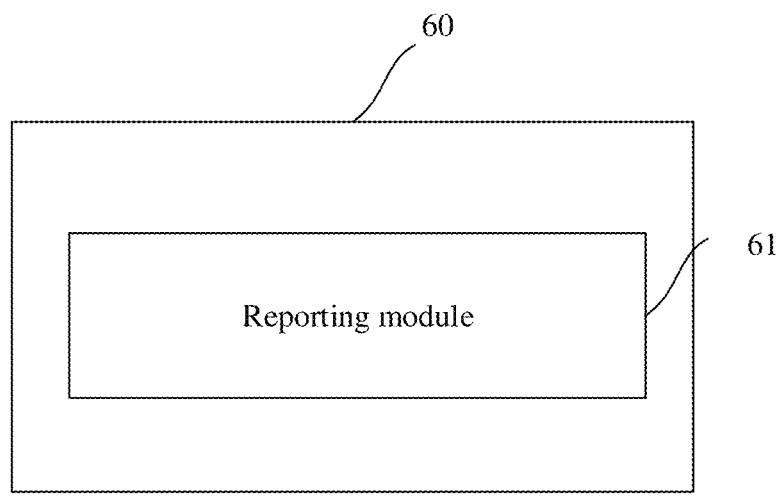
FIG. 6 is a schematic structural diagram of a terminal according to an embodiment of the present application.

Referring to FIG. 6, an embodiment of the present application further provides a terminal 60, including:

a reporting module 61, configured to: in a case that a trigger condition for reporting a power headroom report is satisfied, report a power headroom report, where the power headroom report includes power headroom report information of at least one power control object, and the power control object is an antenna panel or a beam.

In this embodiment of the present application, the antenna panel may also be referred to as: an antenna group, an antenna port group, an antenna set, an antenna port set, a beam set, a beam sub-set, an antenna array, an antenna port array, an antenna sub-array, an antenna port sub-array, a logical entity, an entity, an antenna entity, or the like.

In this embodiment of the present application, the beam may also be referred to as: beam information, spatial relation information, spatial domain transmission filter information, spatial filter information, transmission configuration indicator state information, QCL information, a QCL parameter, or the like. The downlink beam information may be usually represented by TCI state information or QCL information. Uplink beam information may be usually represented by using spatial relation information.

In this embodiment of the present application, the terminal can report a power headroom of an antenna panel or a beam when reporting the power headroom report, not limited to reporting only a power headroom corresponding to a cell, thereby ensuring accurate and precise power control.

Optionally, the trigger condition includes at least one of:
a current power control object having been changed;
a pathloss measurement value or a variation of a pathloss measurement value of the current power control object satisfying a first preset condition;
a power backoff value or a variation of a power backoff value of the current power control object satisfying a second preset condition;
a power management maximum power reduction P-MPR value or a variation of a P-MPR value of the current power control object satisfying a third preset condition;
a P-MPR difference between the current power control object and a first power control object satisfying a fourth preset condition;
a link quality value or a variation of a link quality value of the current power control object satisfying a fifth preset condition;
a link quality difference between the current power control object and the first power control object satisfying a sixth preset condition;
a power control object being activated, enabled, or added;
configuration information of the current power control object or configuration information of the first power control object having been changed; or
information about a serving transmission and reception point having been changed; where
the first power control object is any power control object or a specified power control object in power control objects of the terminal, other than the current power control object.

Optionally, the current power control object having been changed includes:
a network side having indicating to change the current power control object; or
the terminal having changed the current power control object based on a preset change trigger condition.

Optionally, the information about the serving transmission and reception point having been changed includes:
a network side having configured or activated information about a new transmission and reception point; or
configuration information corresponding to the information about the serving transmission and reception point having been changed; or
related configuration information of a control resource set having been changed.

Optionally, the related configuration information includes at least one of control resource set pool index CORESET-PoolIndex information, transmission configuration indicator state information, or search space information.

Optionally, the configuration information corresponding to the information about the serving transmission and reception point includes: at least one of a transmission and reception point identifier, CORESETPoolIndex information, a group identifier, a cell identity, or a physical cell identifier.

Optionally, the reporting a power headroom report includes:
reporting the power headroom report by using at least one MAC CE.

Optionally, the reporting module 61 reports the power headroom report by using one MAC CE, where the MAC CE carries power headroom report information of a preset power control object.

Optionally, the preset power control object is specified by the protocol or configured by the network side.

Optionally, the preset power control object is a current power control object, a to-be-changed-to power control object, or a changed-to power control object.

Optionally, the reporting module 61 reports the power headroom report by using one MAC CE, where the MAC CE carries power headroom report information of at least one power control object.

Optionally, the MAC CE further carries identification information of the at least one power control object or index information corresponding to the at least one power control object.

Optionally, the power control object includes a current power control object.

Optionally, the reporting module 61 reports the power headroom report by using a plurality of MAC CEs, where each of the MAC CEs carries power headroom report information of at least one power control object.

Optionally, when the MAC CE carries power headroom report information of a plurality of power control objects, the power headroom report information of the plurality of power control objects is arranged in a preset order.

Optionally, each of the MAC CEs further carries identification information of the power control object or index information corresponding to the power control object; or
identification information of each of the MAC CEs corresponds to identification information of a corresponding power control object.

Optionally, the identification information or the index information includes at least one of:
identification information of an antenna panel or index information corresponding to an antenna panel;
identification information of a beam or index information corresponding to a beam; or identification information of an antenna panel or index information corresponding to an antenna panel, and identification information of a beam corresponding to the antenna panel or index information corresponding to a beam corresponding to the antenna panel.

In this embodiment of the present application, an identifier of the antenna panel may be: an antenna group identifier, an antenna port group identifier, antenna set identifier, an antenna port set identifier, a beam set identifier, a beam subset identifier, an antenna array identifier, an antenna port array identifier, an antenna subarray identifier, an antenna port subarray identifier, a logical entity identifier, an entity identifier, an antenna entity identifier, a reference signal resource configuration identifier, a reference signal resource identifier, a reference signal resource set identifier, a TCI state identifier, a Quasi-colocation (QCL) information identifier, a spatial relation identifier, or the like.

Optionally, the power headroom report information includes at least one of:
power headroom;
information about a serving cell;
maximum transmit power;
P-MPR;
duty cycle; or
indication information used to indicate whether there is power backoff.

Optionally, in a case that the MAC CE carries the power headroom report information of the at least one power control object, any one piece of information in the power headroom report information is specific to the serving cell (cell specific), or specific to the power control object (for example, panel specific or beam specific), or specific to a power control object corresponding to the serving cell.

Optionally, the power headroom and the maximum transmit power are specific to the power control object, or are specific to the power control object corresponding to the serving cell. Certainly, other information (such as P-MPR) may also be specific to the power control object, or specific to the power control object corresponding to the serving cell.

Optionally, the power control object is:
an antenna panel;
a beam; and
a beam corresponding to an antenna panel.

Optionally, the terminal further includes:
a determining module, configured to determine power headroom information based on a measurement result corresponding to the power control object.

Optionally, the determining module is configured to measure a downlink reference signal corresponding to the power control object; and determine a power headroom of the power control object based on a measurement result of the downlink reference signal.

Optionally, all or part of calculation parameters used in determining the power headroom information are specific to the power control object.

That is, the power headroom information may be calculated by using a calculation formula in an existing 3GPP protocol. However, calculation parameters in the existing calculation formula are all cell-specific. In implementation of the present application, all or part of the calculation parameters used in the calculation formula may be changed to be specific to the power control object. Changing the calculation parameters to be specific to the power control object may be configured by a network-side device by using radio resource control (RRC) signaling. Alternatively, the formula is directly specified by the protocol.

In this embodiment of the present application, optionally, the following formula is used for calculating the power headroom:

$$PH_{type1,b,f,c}(i,j,q_d,l) \times P_{CMAX,f,c}(i) - \{P_{O_{PUSCH},b,f,c}(j) + 10 \log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}$$

$$PH_{type3,b,f,c}(i,q_s) = P_{CMAX,f,c}(i) - \{P_{O_{SRS},B,F,C}(q_s) + 10 \log_{10}(2^\mu \cdot M_{SRS,b,f,c}(i)) + \alpha_{SRS,b,f,c}(q_s) \cdot PL_{b,f,c}(q_d) + h_{b,f,c}(i)\}$$

where, the calculation parameters include: a maximum transmit power $P_{CMAX,f,c}(i)$, open-loop receive-end power target values $P_{O\_PUSCH,b,f,c}(j)$ and $P_{O\_SRS,b,f,c}(q_s)$ the number of resource blocks RBs $M_{RB,b,f,c}^{PUSCH}(i)$ and $M_{SRS,b,f,c}(i)$, partial pathloss compensation factors $\alpha_{b,f,c}(j)$ and $\alpha_{SRS,b,f,c}(q_s)$, pathloss estimation $PL_{b,f,c}(q_d)$, a transmission format related parameter $\Delta_{TF,b,f,c}(i)$, power control adjustment state values $f_{b,f,c}(i,l)$ and $h_{b,f,c}(i)$, and the like.

In the foregoing calculation parameters, the maximum transmit power, partial pathloss compensation factor, pathloss estimation, and the like may be specific to the power control object, for example, being panel-specific or beam-specific.

The terminal provided in this embodiment of the present application is capable of implementing the processes implemented by the terminal in the method embodiment in FIG. 2. To avoid repetition, details are not described herein again.

Figure 7:
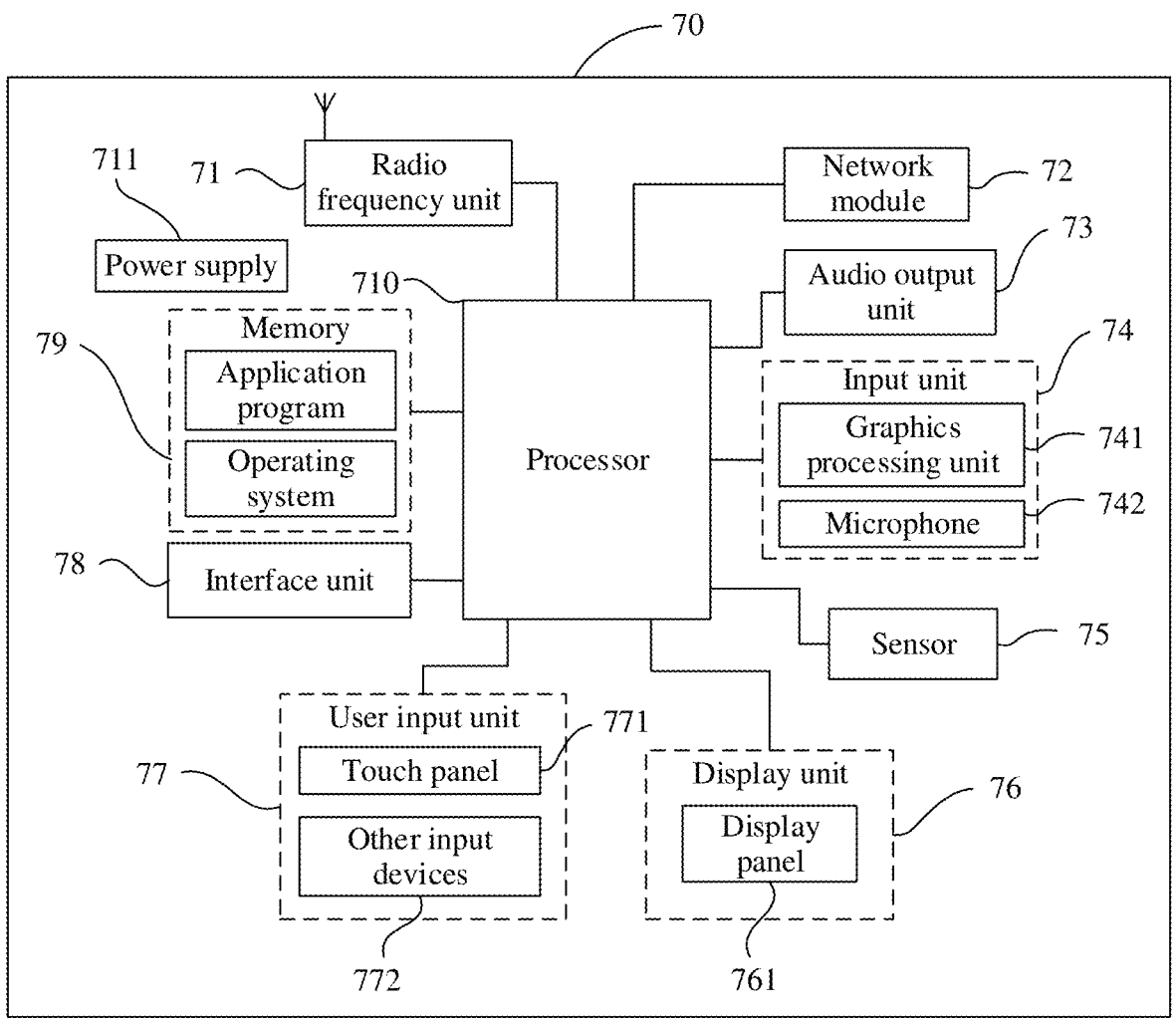
FIG. 7 is a schematic structural diagram of a terminal according to another embodiment of the present application.

FIG. 7 is a schematic structural diagram of hardware of a terminal for implementing the embodiments of the present application. The terminal 70 includes but is not limited to components such as a radio frequency unit 71, a network module 72, an audio output unit 73, an input unit 74, a sensor 75, a display unit 76, a user input unit 77, an interface unit 78, a memory 79, a processor 710, and a power supply 711. A person skilled in the art may understand that the structure of the terminal shown in FIG. 7 does not constitute any limitation on the terminal device. The terminal may include more or fewer components than those shown in the figure, or a combination of some components, or the components disposed differently. In this embodiment of the present application, the terminal includes, but is not limited to, a mobile phone, a tablet computer, a laptop computer, a personal digital assistant, an in-vehicle terminal, a wearable device, a pedometer, and the like.

The processor 710 is configured to: in a case that a trigger condition for reporting a power headroom report is satisfied, report a power headroom report, where the power headroom report includes power headroom report information of at least one power control object, and the power control object is an antenna panel or a beam.

In this embodiment of the present application, the terminal can report a power headroom of an antenna panel or a beam when reporting the power headroom report, not limited to reporting only a power headroom corresponding to a cell, thereby ensuring accurate and precise power control.

The terminal provided in this embodiment of the present application is capable of implementing the processes implemented by the terminal in the method embodiment in FIG. 2. To avoid repetition, details are not described herein again.

It should be understood that in this embodiment of the present application, the radio frequency unit 71 may be configured to: receive and transmit signals in an information receiving/sending process or a call process; and for example, after receiving downlink data from a base station, transmit the downlink information to the processor 710 for processing, and in addition, transmit uplink data to the base station.

Generally, the radio frequency unit 71 includes but is not limited to an antenna, at least one amplifier, a transceiver, a coupler, a low noise amplifier, a duplexer, and the like. In addition, the radio frequency unit 71 may also communicate with a network and other devices via a wireless communications system.

The terminal provides a user with wireless broadband internet access through the network module 72, for example, helping the user to transmit and receive e-mails, browse web pages, and access streaming media.

The audio output unit 73 may convert audio data received by the radio frequency unit 71 or the network module 72 or stored in the memory 79 into an audio signal and output the audio signal as a sound. Furthermore, the audio output unit 73 may also provide audio output (for example, a call signal received sound or a message received sound) related to a specific function performed by the terminal 70. The audio output unit 73 includes a speaker, a buzzer, a receiver, and the like.

The input unit 74 is configured to receive an audio or video signal. The input unit 74 may include a graphics processing unit (GPU) 741 and a microphone 742. The graphics processing unit 741 processes image data of a still picture or a video obtained by an image capture apparatus (for example, a camera) in an image capture mode or a video capture mode. A processed image frame may be displayed on the display unit 76. The image frame processed by the graphics processing unit 741 may be stored in the memory 79 (or another storage medium) or be sent by the radio frequency unit 71 or the network module 72. The microphone 742 is capable of receiving sounds and processing such sounds into audio data. The processed audio data may be converted in a telephone call mode into a format that can be transmitted by the radio frequency unit 71 to a mobile communications base station, for outputting.

The terminal 70 further includes at least one sensor 75, for example, an optical sensor, a motion sensor, and other sensors. For example, the optical sensor may include an ambient light sensor and a proximity sensor. The ambient light sensor may adjust luminance of the display panel 761 based on brightness of ambient light, and the proximity sensor may turn off the display panel 761 and/or backlight when the terminal 70 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 75 may also include a fingerprint sensor, a pressure sensor, an iris sensor, a molecular sensor, a gyroscope, a barometer, a hygrometer, a thermometer, an infrared sensor, and the like. Details are not described herein.

The display unit 76 is configured to display information input by the user or information provided to the user. The display unit 76 may include a display panel 761, and the display panel 761 may be configured in a form of a liquid crystal display (LCD), an organic light-emitting diode (OLED), or the like.

The user input unit 77 may be configured to: receive a digit or character information that is input, and generate signal input related to user settings and function control of the terminal. For example, the user input unit 77 may include a touch panel 771 and other input devices 772. The touch panel 771 is also referred to as a touchscreen and can collect a touch operation (such as an operation performed by the user on the touch panel 771 or near the touch panel 771 with a finger or by using any proper object or accessory such as a stylus) of the user on or near the touch panel 771. The touch panel 771 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 710, and can receive a command transmitted by the processor 710 and execute the command. In addition, the touch panel 771 may be implemented in a plurality of forms, for example, as a resistive, capacitive, infrared, or surface acoustic wave touch panel. The user input unit 77 may further include the other input devices 772 in addition to the touch panel 771. For example, the other input devices 772 may include but are not limited to a physical keyboard, a function key (such as a volume control key or an on/off key), a trackball, a mouse, and a joystick. Details are not described herein.

Optionally, the touch panel 771 may cover the display panel 761. When detecting a touch operation on or near the touch panel 771, the touch panel 771 transmits the touch operation to the processor 710 to determine a type of a touch event. Then, the processor 710 provides a corresponding visual output on the display panel 761 based on the type of the touch event. In FIG. 7, the touch panel 771 and the display panel 761 serve as two independent components to implement input and output functions of the terminal. In some embodiments, however, the touch panel 771 may be integrated with the display panel 761 to implement the input and output functions of the terminal. This is not limited herein.

The interface unit 78 is an interface between an external apparatus and the terminal 70. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 78 may be configured to: receive input (for example, data information and power) from the external apparatus, and transmit the received input to one or more elements in the terminal 70, or may be configured to transmit data between the terminal 70 and the external apparatus.

The memory 79 may be configured to store software programs and various data. The memory 79 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 79 may include a high-speed random access memory, and may further include a non-volatile memory such as at least one disk storage device, a flash memory device, or another volatile solid-state storage device.

The processor 710 is a control center of the terminal, and is connected to all components of the terminal by using various interfaces and lines. By running or executing a software program and/or module that is stored in the memory 79 and calling data stored in the memory 79, the processor 710 executes various functions of the terminal and processes data, so as to perform overall monitoring on the terminal. The processor 710 may include one or more processing units. Optionally, the processor 710 may integrate an application processor and a modem processor. The application processor mainly processes the operating system, a user interface, an application program, and the like. The modem processor mainly processes wireless communication. It can be understood that the modem processor may alternatively be not integrated in the processor 710.

The terminal 70 may further include the power supply 711 (such as a battery) supplying power to each component. Optionally, the power supply 711 may be logically connected to the processor 710 by using a power management system, so that functions such as charge and discharge management and power consumption management are implemented by using the power management system.

In addition, the terminal 70 includes some functional modules that are not illustrated. Details are not described herein.

Figure 8:
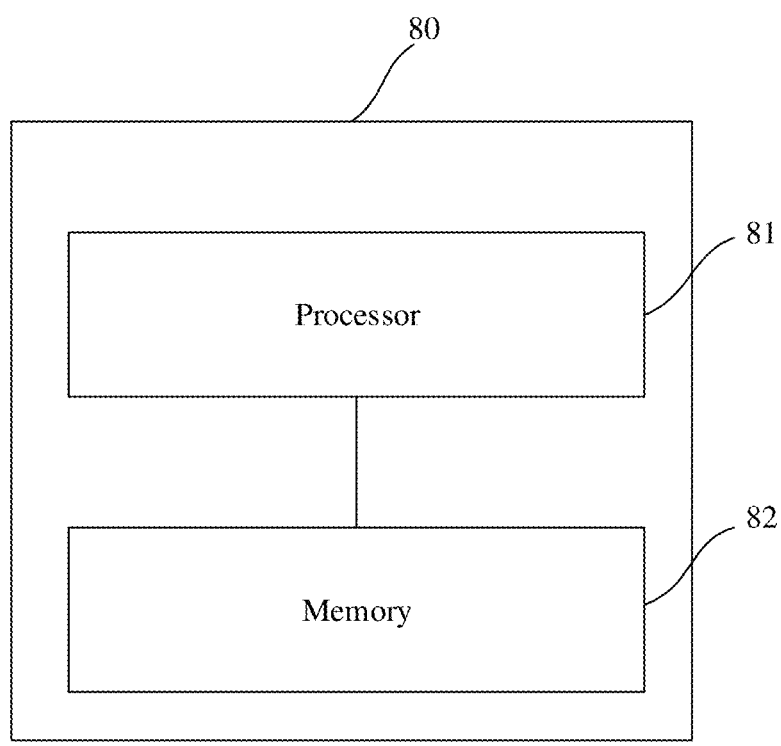
FIG. 8 is a schematic structural diagram of a terminal according to still another embodiment of the present application.

Referring to FIG. 8, an embodiment of the present application further provides a terminal 80, including a processor 81, a memory 82, and a computer program stored in the memory 82 and executable on the processor 81. When the computer program is executed by the processor 81, the processes in the foregoing embodiment of the method for reporting a power headroom report are implemented, with the same technical effects achieved. To avoid repetition, details are not described herein again.

An embodiment of the present application further provides a non-transitory computer-readable storage medium, where a computer program is stored in the non-transitory computer-readable storage medium. When the computer program is executed by a processor, the processes in the foregoing embodiment of the method for reporting a power headroom report are implemented, with the same technical effects achieved. To avoid repetition, details are not described herein again. The non-transitory computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. Based on such an understanding, the technical solutions of the present application essentially, or the part contributing to the prior art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present application.

Some embodiments of the present application have been described with reference to the attached drawings; however, the present application is not limited to the aforesaid embodiments, and these embodiments are merely illustrative but are not intended to limit the present application. Persons of ordinary skill in the art may further derive many other implementations according to the teachings of the present application and within the scope defined in the claims, and all of the implementations shall fall within the scope of the present application.

What is claimed is:

1. A method for reporting a power headroom report, performed by a terminal and comprising:
   in a case that a trigger condition for reporting a power headroom report is satisfied, reporting a power headroom report, wherein the power headroom report comprises power headroom report information of at least two power control objects, and a power control object of the at least two power control objects is an antenna panel; wherein
   the reporting the power headroom report comprises:
      reporting the power headroom report by using at least one medium access control control element (MAC CE);
   wherein, in response to carrying power headroom report information of a plurality of power control objects in a MAC CE of the at least one MAC CE, the power headroom report information of the plurality of power control objects is arranged in an order of identifiers of the plurality of power control objects or an order of corresponding numbers of the plurality of power control objects;
   wherein the trigger condition comprises:
   a link quality difference between a current power control object and a first power control object satisfying a sixth preset condition; wherein
   the first power control object is any power control object or a specified power control object in power control objects of the terminal, other than the current power control object.

2. The method according to claim 1, wherein the trigger condition further comprises at least one of:
   the current power control object having been changed;
   a pathloss measurement value or a variation of a pathloss measurement value of the current power control object satisfying a first preset condition;
   a power backoff value or a variation of a power backoff value of the current power control object satisfying a second preset condition;
   a power management maximum power reduction (P-MPR) value or a variation of a P-MPR value of the current power control object satisfying a third preset condition;
   a P-MPR difference between the current power control object and the first power control object satisfying a fourth preset condition;
   a link quality value or a variation of a link quality value of the current power control object satisfying a fifth preset condition;
   a power control object being activated, enabled, or added;
   configuration information of the current power control object or configuration information of the first power control object having been changed; or
   information about a serving transmission and reception point having been changed; wherein
   the current power control object having been changed comprises:

a network side having indicating to change the current power control object; or the terminal having changed the current power control object based on a preset change trigger condition; or the information about the serving transmission and reception point having been changed comprises:

a network side having configured or activated information about a new transmission and reception point; or configuration information corresponding to the information about the serving transmission and reception point having been changed; or related configuration information of a control resource set having been changed.

3. The method according to claim 2, wherein the related configuration information comprises at least one of control resource set pool index (CORESETPoolIndex) information, transmission configuration indicator state information, or search space information; or the configuration information corresponding to the information about the serving transmission and reception point comprises: at least one of a transmission and reception point identifier, CORESETPoolIndex information, a group identifier, a cell identity, or a physical cell identifier.

4. The method according to claim 1, wherein the reporting the power headroom report by using the at least one MAC CE comprises:

reporting the power headroom report by using one MAC CE, wherein the MAC CE carries power headroom report information of a preset power control object, and the preset power control object is a current power control object, a to-be-changed-to power control object, or a changed-to power control object.

5. The method according to claim 1, wherein the reporting the power headroom report by using the at least one MAC CE comprises:

reporting the power headroom report by using one MAC CE, wherein the MAC CE carries power headroom report information of at least two power control objects.

6. The method according to claim 5, wherein the MAC CE further carries identification information of the at least two power control-objects or index information corresponding to the at least two power control-objects.

7. The method according to claim 6, wherein the identification information or the index information comprises:

identification information of an antenna panel or index information corresponding to an antenna panel.

8. The method according to claim 5, wherein the power control object comprises a current power control object.

9. The method according to claim 5, wherein the power headroom report information comprises at least one of:

power headroom;
information about a serving cell;
maximum transmit power;
power management maximum power reduction (P-MPR);
duty cycle; or
indication information used to indicate whether there is power backoff.

10. The method according to claim 9, wherein in a case that the MAC CE carries the power headroom report information of the at least two power control objects, any one piece of information in the power headroom report information is specific to the serving cell, or is specific to the power control object, or is specific to a power control object corresponding to the serving cell.

11. The method according to claim 1, wherein each of the MAC CEs further carries identification information of the power control object or index information corresponding to the power control object; or identification information of each of the MAC CEs corresponds to identification information of a corresponding power control object.

12. The method according to claim 1, before the reporting the power headroom report, further comprising:

determining power headroom information based on a measurement result corresponding to the power control object; wherein the determining power headroom information based on a measurement result corresponding to the power control object comprises:

measuring a downlink reference signal corresponding to the power control object; and determining a power headroom of the power control object based on a measurement result of the downlink reference signal.

13. A terminal, comprising a processor, a memory, and a computer program stored in the memory and executable on the processor, wherein the computer program, when executed by the processor, causes the terminal to perform:

in a case that a trigger condition for reporting a power headroom report is satisfied, reporting a power headroom report, wherein the power headroom report comprises power headroom report information of at least two power control objects, and a power control object of the at least two power control objects is an antenna panel; wherein the computer program, when executed by the processor, causes the terminal to perform:

reporting the power headroom report by using at least one medium access control control element (MAC CE);

and wherein in response to carrying power headroom report information of a plurality of power control objects in a MAC CE of the at least one MAC CE, the power headroom report information of the plurality of power control objects is arranged in an order of identifiers of the plurality of power control objects or an order of corresponding numbers of the plurality of power control objects;

wherein the trigger condition comprises:

a link quality difference between a current power control object and a first power control object satisfying a sixth preset condition; wherein the first power control object is any power control object or a specified power control object in power control objects of the terminal, other than the current power control object.

14. The terminal according to claim 13, wherein the computer program, when executed by the processor, causes the terminal to perform:

reporting the power headroom report by using one MAC CE, wherein the MAC CE carries power headroom report information of at least two power control-objects.

15. The terminal according to claim 14, wherein the MAC CE further carries identification information of the at least two power control objects or index information corresponding to the at least two power control-objects.

16. The terminal according to claim 13, wherein the trigger condition further comprises at least one of:
- the current power control object having been changed;
- a pathloss measurement value or a variation of a pathloss measurement value of the current power control object satisfying a first preset condition;
- a power backoff value or a variation of a power backoff value of the current power control object satisfying a second preset condition;
- a power management maximum power reduction (P-MPR) value or a variation of a P-MPR value of the current power control object satisfying a third preset condition;
- a P-MPR difference between the current power control object and the first power control object satisfying a fourth preset condition;
- a link quality value or a variation of a link quality value of the current power control object satisfying a fifth preset condition;
- a power control object being activated, enabled, or added;
- configuration information of the current power control object or configuration information of the first power control object having been changed; or
- information about a serving transmission and reception point having been changed; wherein the current power control object having been changed comprises:
- a network side having indicating to change the current power control object; or
- the terminal having changed the current power control object based on a preset change trigger condition;

or the information about the serving transmission and reception point having been changed comprises:
- a network side having configured or activated information about a new transmission and reception point; or
- configuration information corresponding to the information about the serving transmission and reception point having been changed; or
- related configuration information of a control resource set having been changed.

17. The terminal according to claim 16, wherein the related configuration information comprises at least one of control resource set pool index (CORESETPoolIndex) information, transmission configuration indicator state information, or search space information;

or the configuration information corresponding to the information about the serving transmission and reception point comprises: at least one of a transmission and reception point identifier, CORESETPoolIndex information, a group identifier, a cell identity, or a physical cell identifier.

18. A non-transitory computer-readable storage medium, wherein a computer program is stored in the non-transitory computer-readable storage medium, and the computer program, when executed by a processor of a terminal, causes the terminal to perform:
- in a case that a trigger condition for reporting a power headroom report is satisfied, reporting a power headroom report, wherein the power headroom report comprises power headroom report information of at least two power control objects, and a power control object of the at least two power control objects is an antenna panel; wherein
the computer program, when executed by the processor, causes the terminal to perform:

reporting the power headroom report by using at least one medium access control control element (MAC CE);

wherein in response to carrying power headroom report information of a plurality of power control objects in a MAC CE of the at least one MAC CE, the power headroom report information of the plurality of power control objects is arranged in an order of identifiers of the plurality of power control objects or an order of corresponding numbers of the plurality of power control objects;

wherein the trigger condition comprises:
a link quality difference between a current power control object and a first power control object satisfying a sixth preset condition; wherein
the first power control object is any power control object or a specified power control object in power control objects of the terminal, other than the current power control object.

19. The non-transitory computer-readable storage medium according to claim 18, wherein the trigger condition further comprises at least one of:
- the current power control object having been changed;
- a pathloss measurement value or a variation of a pathloss measurement value of the current power control object satisfying a first preset condition;
- a power backoff value or a variation of a power backoff value of the current power control object satisfying a second preset condition;
- a power management maximum power reduction (P-MPR) value or a variation of a P-MPR value of the current power control object satisfying a third preset condition;
- a P-MPR difference between the current power control object and the first power control object satisfying a fourth preset condition;
- a link quality value or a variation of a link quality value of the current power control object satisfying a fifth preset condition;
- a power control object being activated, enabled, or added;
- configuration information of the current power control object or configuration information of the first power control object having been changed; or
- information about a serving transmission and reception point having been changed; wherein
the current power control object having been changed comprises:
- a network side having indicating to change the current power control object; or
- the terminal having changed the current power control object based on a preset change trigger condition;

or the information about the serving transmission and reception point having been changed comprises:
- a network side having configured or activated information about a new transmission and reception point; or
- configuration information corresponding to the information about the serving transmission and reception point having been changed; or
- related configuration information of a control resource set having been changed.

20. The non-transitory computer-readable storage medium according to claim 19, wherein the related configuration information comprises at least one of control resource set pool index (CORESETPoolIndex) information, transmission configuration indicator state information, or search space information;

or
the configuration information corresponding to the information about the serving transmission and reception point comprises: at least one of a transmission and reception point identifier, CORESETPoolIndex information, a group identifier, a cell identity, or a physical cell identifier.

\* \* \* \* \*